(No Model.)

J. HILTON.
DETACHABLE SAW HANDLE.

No. 244,390. Patented July 19, 1881.

Attest:
Wm. Dietz
Chas. C. Kerrick

Inventor.
James Hilton, per
Thos. S. Crane, Atty.

UNITED STATES PATENT OFFICE.

JAMES HILTON, OF NEWARK, NEW JERSEY.

DETACHABLE SAW-HANDLE.

SPECIFICATION forming part of Letters Patent No. 244,390, dated July 19, 1881.

Application filed January 12, 1881. (No model.)

*To all whom it may concern:*

Be it known that I, JAMES HILTON, a citizen of the United States, residing at Newark, Essex county, New Jersey, have invented a new and useful Detachable Saw-Handle, of which the following is a description.

My invention relates to an improvement in detachable saw-handles; and it consists in an improved construction of the ferrule, nut, and guide-collar employed in combination with a hooked bolt for clamping a removable handle to a saw-blade.

The special advantage of my invention consists in its adapting the handle with the greatest facility to assume various angles with the edge or end of the saw, and in the adjusting or grooved collar being secured neatly to the handle in such a manner that it can turn freely without opposing perceptible frictional resistance to the tightening of the nut upon the screwed hook-bolt.

Figure 1:
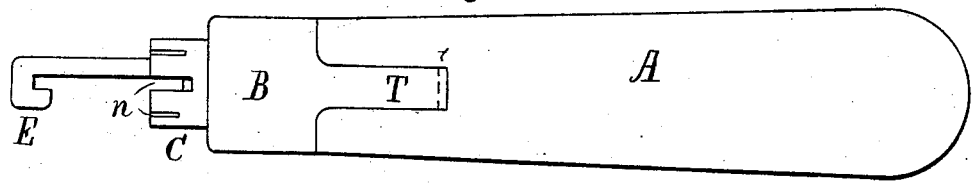
Figure 2:
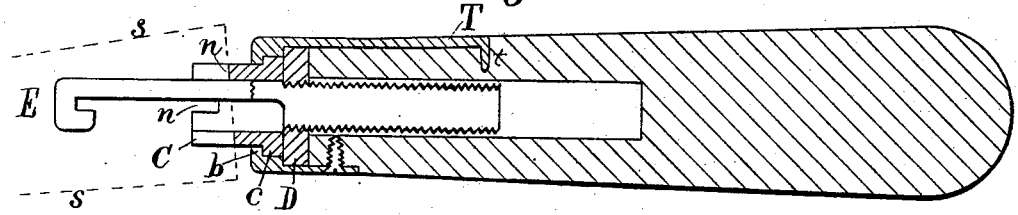
Figures 3, 4, 5:
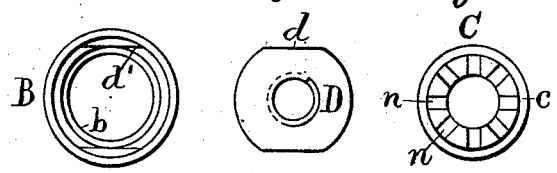
Figures 6, 7:
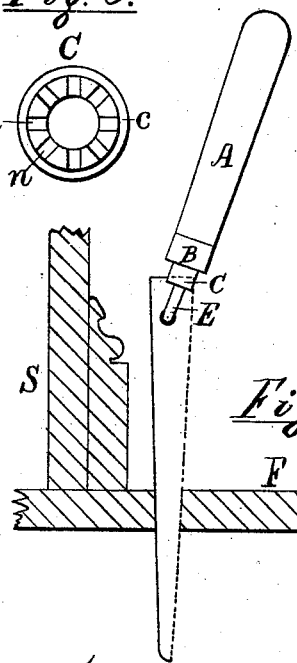

The novel features referred to will be understood by reference to the annexed drawings, in which Figure 1 is a side view of my handle ready for use. Fig. 2 is a central section lengthwise of the same. Fig. 3 is an inside end view of the ferrule. Fig. 4 is an end view of the nut; Fig. 5, an end view of the front of the grooved collar; Fig. 6, a view of a pruning-saw provided with one of my handles, and Fig. 7 a sectional view of a floor and surbase, showing the adaptation of my handle to a compass-saw.

A is the wooden handle, of round form, shaped to be held in one hand like a chisel-handle.

B is a ferrule provided with a slight inward flange, *b*, at its front end.

C is the collar interposed between the handle and the saw-blade, and in my invention inserted partly inside the ferrule B and formed with an annular flange, *c*, on the outside of its inner end, to engage with the flange *b* and prevent the loss of the collar from the handle.

D is the nut contained inside the ferrule in contact with the inner end of the collar C, and held stationary by flats *d*, formed upon the same and upon the inside of the ferrule, as at *d'* in Fig. 3.

The body of the ferrule is fitted to the end of the wooden handle A, and may be secured thereto in any desired manner. In Fig. 1 it is shown formed with a tongue, T, extending up the handle, and having a bent prong, *t*, formed at its upper extremity, which is forced into the wood, as shown at *t* in Fig. 2. At one side of the ferrule is shown in Fig. 2 a screw inserted through the ferrule into the wood, and any other fastening may be used if desired.

The chief object of my invention—viz., adapting the handle to be set at various angles with the saw-blade—is accomplished by providing the front end of the loose collar C with several slots or open notches, *n*, the bottoms of which are formed of different depths upon the opposite sides of the hooked bolt E, which penetrates the handle and the nut D through a round hole in the center of the collar.

The hook upon the end of the bolt E is formed of the ordinary shape, and is used by inserting it through a hole in the saw-blade and clamping the saw between the hook *e* and the slot *n* in the collar C, the handle and nut being turned while the bolt remains stationary to draw the hook toward the collar.

In the section of the collar shown in Fig. 2 a slot with an inclined bottom is plainly shown, and the blade of a compass-saw indicated by dotted lines at *s* to show the angle assumed by the handle when the saw is inserted in such a slot. Three slots are shown in the end of the collar in Fig. 5, and it can readily be seen that more might be provided, and that by varying the angle which the bases of the slots make with the axis of the handle the saw's relation to the handle may be varied in the desired manner. To show the utility of this arrangement I have shown the handle applied to a pruning-saw in Fig. 6 and to a compass-saw in Fig. 7.

In the case of a pruning-saw, usually provided with teeth of different kinds upon its opposite edges, it is obvious that when standing upon a ladder the user would often find it advantageous to set the handle in the inclined position shown in the figure, and it is also plain that if the handle were permanently secured to the blade in that position, the opposite edge of the saw could not be conveniently used at all. My detachable handle is, however, easily loosened from the blade, and the collar turned in the opposite direction without removing the hooked bolt from the hole in the saw at all.

Either the compass or pruning saw can be set in a line with the handle by using a slot with a bottom of uniform depth, and when desired the compass-saw can be set at an angle adapted to any special location where it is to be used. This is shown in Fig. 7, where the saw is shown inserted in a floor, F, near a surbase, S, and the handle is inclined away from the surbase to afford room for the operator's hand.

From the above description it is evident that such a handle is adapted to be used with a set of saw-blades suited to a variety of purposes, and is better adapted to most of them than a fixed or permanent handle would be. Thus it is peculiarly adapted for use as an auxiliary handle upon the back of a cross-cut saw, and may be set in a variety of positions in connection with a single hole near the edge of the back, thus enabling the operator to set it at the most comfortable angle for his personal use, while it can readily be placed at a different angle for another user.

I am aware that the combination of a hooked bolt with a handle is not new, and that a collar or washer having a single slot at right angles to the bolt has also been used, and I do not therefore claim such elements, broadly; but in such previous inventions, as in Patent No. 165,051, of 1875, the movable washer or cap has been applied to the outside of the ferrule, and was thus unavoidably made large and clumsy in comparison with mine.

To adapt my handle for use with compass and other small saws in the manner described, I prefer to make the washer or collar C quite small, and am thus enabled to insert it inside the end of the ferrule, and secure it therein by the annular flanges $b$ and $c$. This construction is materially different from any other provided with either a plain or grooved washer, and I do not therefore claim a movable washer, broadly, but desire to secure my improvements as follows:

In combination with the handle, hooked bolt, nut, and ferrule, constructed and operated substantially as described, the collar C, flanged into the ferrule and provided with open slots or notches $n$ $n$, the latter having their bottoms formed at various angles with the bolt E, and thereby adapted to hold a saw-blade at various angles with the handle when changed from one slot to another and clamped to the handle by the bolt, in the manner specified.

In testimony that I claim the foregoing I have hereto set my hand this 30th day of December, 1880.

JAMES HILTON.

Attest:
DEWEY A. WHITEHEAD,
THOS. S. CRANE.